United States Patent
Kim et al.

(10) Patent No.: US 9,358,960 B2
(45) Date of Patent: Jun. 7, 2016

(54) WIPING DEVICE

(71) Applicants: Hyundai Motor Company, Seoul (KR);
Kia Motors Corporation, Seoul (KR);
Korea Institute of Industrial Technology, Cheonan, Chungeheongnam-do (KR)

(72) Inventors: Kyoung Hye Kim, Gyeonggi-Do (KR); Choong Young Choi, Gyeonggi-Do (KR); Jae Yun Shim, Gyeonggi-Do (KR)

(73) Assignees: Hyundai Motor Company, Seoul (KR); Kia Motors Corporation, Seoul (KR); Korea Institute of Industrial Technology, Cheonan, Chungcheongnam-do (KR)

( * ) Notice: Subject to any disclaimer, the term of this patent is extended or adjusted under 35 U.S.C. 154(b) by 0 days.

(21) Appl. No.: 14/693,581

(22) Filed: Apr. 22, 2015

(65) Prior Publication Data

US 2015/0360652 A1   Dec. 17, 2015

(30) Foreign Application Priority Data

Jun. 16, 2014   (KR) .................. 10-2014-0073082

(51) Int. Cl.
*B60S 3/06* (2006.01)
*D02G 3/38* (2006.01)
*D02G 3/44* (2006.01)

(52) U.S. Cl.
CPC . *B60S 3/066* (2013.01); *D02G 3/38* (2013.01); *D02G 3/446* (2013.01); *A46B 2200/3046* (2013.01)

(58) Field of Classification Search
CPC ... A46B 2200/3046; B60S 3/06; B60S 3/063; B60S 3/066
See application file for complete search history.

(56) References Cited

U.S. PATENT DOCUMENTS

| | | | |
|---|---|---|---|
| 5,592,712 A * | 1/1997 | Favagrossa | A46B 13/001 15/179 |
| 2004/0049871 A1 * | 3/2004 | Hotani | A46B 13/001 15/181 |

FOREIGN PATENT DOCUMENTS

| | | |
|---|---|---|
| JP | 07-166442 A | 7/1995 |
| JP | 2003-020534 A | 1/2003 |
| JP | 2009-520561 A | 5/2009 |
| KR | 20-0428380 | 10/2006 |

* cited by examiner

*Primary Examiner* — Randall Chin
(74) *Attorney, Agent, or Firm* — Mintz Levin Cohn Ferris Glovsky and Popeo, P.C.; Peter F. Corless

(57) ABSTRACT

A wiping device is provided. The wiping device includes a cartridge. In addition, wiping yarns are disposed on an outer circumference of the cartridge. The wiping yarn includes core yarns substantially perpendicular to the cartridge and sub-yarns disposed extraneous to the core yarns and configured to gather contaminants from a vehicle body.

18 Claims, 4 Drawing Sheets

WIPING DEVICE

CROSS-REFERENCE TO RELATED APPLICATION

This application claims priority to and the benefit of Korean Patent Application No. 10-2014-0073082 filed on Jun. 16, 2014, the entire contents of which are incorporated herein by reference.

BACKGROUND OF THE INVENTION (a) Field of the Invention

The present invention relates to a wiping device, and more particularly, to a wiping device that removes contaminants from a surface of a vehicle body to prevent poor paint application on the surface of the vehicle body due to the contaminants.

(b) Description of the Related Art

A surface of a vehicle body may become contaminated with contaminants (e.g., dust or chips) while proceeding along various production lines. The contaminants, which may cause poor (e.g., uneven) paint application, may be wiped off (e.g., removed) using a wiping device prior to a paint application. The wiping device includes a cartridge, that rotates, connected to a driving unit of a wiping machine, and a plurality of pieces of wiping material, that rotate with the cartridge, arranged on an outer circumference of the cartridge configured to remove the contaminants from the surface of the vehicle body.

In addition, ostrich feathers, which are smooth may be able to effectively gather dust and a small quantity of static electricity, are widely used as the wiping material. However, the ostrich feathers may be difficult to fix to the cartridge, and may fall off easily or frequently become damaged. The hard rachis within the ostrich feather may also scratch the vehicle body. Further, since the cartridge and the ostrich feathers may be directly connected, new ostrich feathers may not easily be attached to only a part requiring maintenance, and maintenance costs may increase. Furthermore, ostrich feathers may be expensive due to material characteristics and limited supply thereof.

The above information disclosed in this section is merely for enhancement of understanding of the background of the invention and therefore it may contain information that does not form the prior art that is already known in this country to a person of ordinary skill in the art.

SUMMARY OF THE INVENTION

The present invention provides a wiping device that may prevent scratching to a surface of a vehicle body while removing contaminants and may use artificial wiping yarn of a substantially smooth material. Further, the present invention provides a wiping device in which wiping yarn may be stably fixed to a cartridge and may be more easily replaced when the wiping yarn falls off or becomes damaged. The present invention also provides a wiping device that may reduce material costs and avoid supply issues, by using a mass-produced artificial material.

The present invention provides a wiping device that may include: a cartridge; and a plurality of wiping yarns disposed on an outer circumference of the cartridge, wherein the wiping yarn may include core yarns substantially perpendicular to the cartridge and sub-yarn disposed extraneous to the core yarns. The wiping yarn may be configured to gather contaminants from a vehicle body.

The core yarns may include a first core yarn disposed at a substantial center of the wiping yarn, a second core yarn disposed extraneous to the first yarn, a third core yarn disposed extraneous to the second yarn, and a fourth core yarn wrapped around the exterior of the third yarn. The wiping device may be heat-treated at a set temperature for a set period of time. During the heat treatment, the sub-yarn may adhere to the third core yarn while the third core yarn is melted. The first and fourth core yarns may be made of a polypropylene resin. The second core yarn may be made of a polyester resin. The third core yarn may be made of a nylon resin. The sub-yarn may include a micro-fiber fixed by the fourth core yarn. The sub-yarn may be made of the polyester resin.

One or more insertion grooves may be formed on the outer circumference of the cartridge, and an insertion block with the wiping yarn attached may be removably joined to the insertion groove. Within the cartridge, one or more joining protrusions may be formed on one side (e.g., a first side) in the circumferential direction, and joining grooves, configured to join with the jointing protrusions, may be formed on an opposite side (e.g., a second side). Guide grooves may be formed on both sides of the insertion block in the direction of the respective insertion grooves. Guide protrusions that correspond to the guide grooves may be formed on the insertion grooves, respectively, and the insertion block may be removably joined to the insertion groove.

The wiping yarn may be attached to the insertion block using one or more clips. The clips may include fixation ends disposed on the insertion block configured to join the insertion block to the insertion groove and fix the wiping yarn, and insertion ends, which may be formed by bending both ends of the fixation end downwards. The insertion ends may be inserted into the joining apertures formed on a side of the insertion block.

The present invention may prevent scratches to a surface of a vehicle body while removing contaminants from the surface of a vehicle body. Further, when the wiping yarn is damaged or falls off, the wiping yarn may be more easily replaced by replacing or removing only an insertion block of a damaged part, which may reduce maintenance cost of the wiping device. Additionally, the wiping yarn may more sturdily attach to the insertion block using a substantially elastic clip. Furthermore, demand needs for the yarn may be met more easily relative to ostrich feathers as is used in the related art and material costs may be reduced.

BRIEF DESCRIPTION OF THE DRAWINGS

The above and other features of the present invention will now be described in detail with reference to certain exemplary embodiments thereof illustrated in the accompanying drawings which are given herein below by way of illustration only, and thus are not limitative of the present invention, and wherein.

DESCRIPTION OF SYMBOLS

Figure 1:
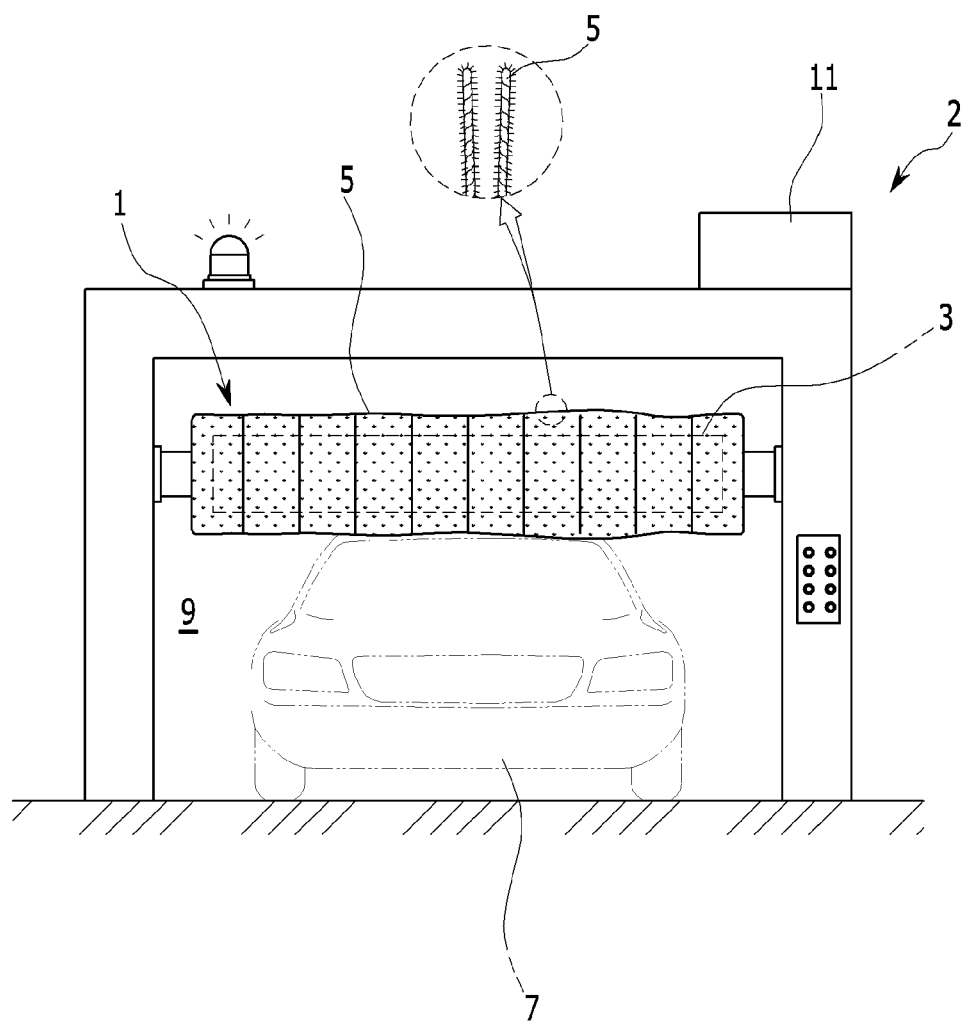
FIG. 1 is an exemplary schematic installation diagram of a wiping device according to an exemplary embodiment of the present invention.

1: Wiping device
2: Wiping machine
3: Cartridge
5: Wiping yarn
7: Vehicle body
9: Tunnel
11: Driving unit
13: First core yarn
15: Second core yarn
16: Core yarn
17: Third core yarn
19: Fourth core yarn
21: Sub-yarn
23: Insertion groove
23a: Guide protrusion
25: Insertion block
25a: Guide groove
27: Joining protrusion
29: Joining groove
31: Clip
33: Fixation end
35: Insertion end
37: Joining hole

DETAILED DESCRIPTION OF THE EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present invention will be described in detail with reference to the accompanying drawings. However, the size and thickness of each component illustrated in the drawings are arbitrarily shown for better understanding and ease of description, but the present invention is not limited thereto. Thicknesses are enlarged to clearly express various portions and areas.

Further, parts which are not associated with the description are omitted to clearly describe exemplary embodiments of the present invention, and names of elements in the following description are distinguished into first, second, and the like to distinguish the elements because the names of the elements are the same, and are not particularly limited to an order thereof. Furthermore, in describing an exemplary embodiment of the present invention, a wiping device according to an exemplary embodiment of the present invention may be installed on a production line of an automobile and may be configured to gather contaminants (e.g., dust and the like) which may be deposited on a vehicle body using a wiping yarn that rotates, and may be different from a washing brush for a general washing device using detergent and water.

Figure 2:
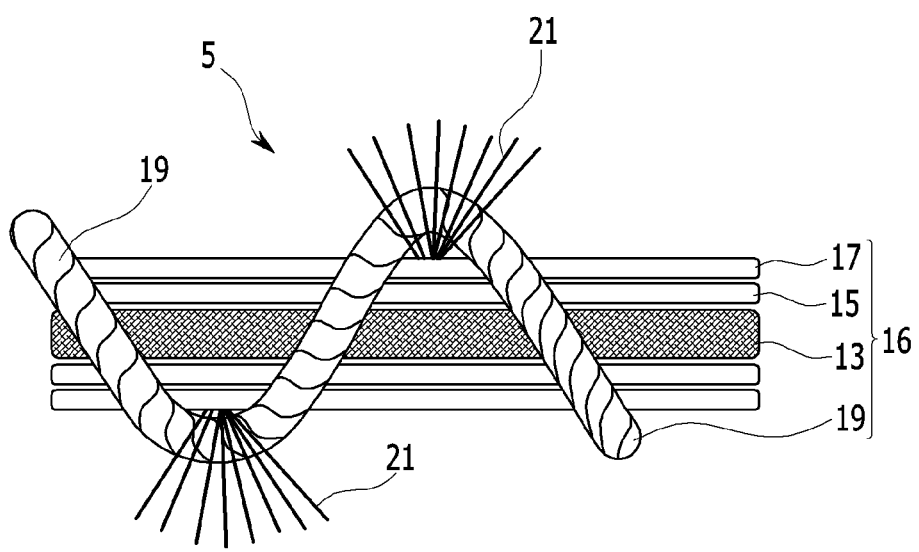
FIG. 2 is an exemplary enlarged cross-sectional view of a wiping yarn of the wiping device according to the exemplary embodiment of the present invention.

FIG. 1 is an exemplary schematic installation diagram of a wiping device according to an exemplary embodiment of the present invention, and FIG. 2 is an exemplary enlarged cross-sectional view of wiping yarn of the wiping device according to the exemplary embodiment of the present invention.

Referring to FIG. 1, the wiping device 1 according to the exemplary embodiment of the present invention may include a cartridge 3 and a plurality of pieces of wiping yarn 5 disposed on an outer circumference of the cartridge 3. The wiping device 1 may be installed on a production line of a vehicle using a wiping machine 2. The wiping machine 2 may include a tunnel 9, through which a vehicle body 7 may pass, and a driving unit 11 (e.g., a motor) installed on the upper side of the tunnel 9. In other words, the wiping yarn 5 may remove contaminants from the surface of the vehicle body 7 while the cartridge 3 rotates when the driving unit is operated. Since the wiping machine 2 is well-known in the art, a detailed description thereof will be omitted.

Referring to FIG. 2, the wiping yarn 5 of the wiping device according to the exemplary embodiment of the present invention may include a plurality of core yarns 16 and sub-yarn 21. The plurality of core yarns 16 may include a first core yarn 13, a second core yarn 15, a third core yarn 17, and a fourth core yarn 19. The first core yarn 13 may be made of a polypropylene (PP) resin and may be disposed at a substantial center of the wiping yarn 5. The first core yarn 13 may promote lightness and a substantially perpendicular attachment of the wiping yarn. The second core yarn 15 may be made of a polyester resin and may be disposed extraneous to the first core yarn 13. Further, the second core yarn 15 may be made of the polyester resin that has a substantially low melting point, and as a result, a part of the second core yarn 15 may be joined with the sub-yarn 21 during heat treatment. As a result, the second core yarn 15 may prevent the sub-yarn 21 from separating from the wiping yarn. The polypropylene resin and the polyester resin are generally known in the art and a detailed description thereof will be omitted.

The third core yarn 17 may be made of a nylon resin and may be disposed extraneous to the second core yarn 15. The sub-yarn 21 may adhere to the third core yarn 17 while the third core yarn 17 melts during the heat treatment. The fourth core yarn 19 may be made of the polypropylene resin and may be wrapped around an exterior of the third core yarn 17 (e.g., to surround) to fix the plurality of core yarns 16 and the sub-yarn 21. The sub-yarn 21 may be made of the polyester resin and may be fixed by the fourth core yarn 19. The sub-yarn may be configured to gather contaminants while in direct contact with the vehicle body 7. The sub-yarn 21 may include a micro-fiber which may effectively gather dust and the like.

The wiping yarn 5 may be heat-treated in an oven at a set temperature for a set time. The set temperature may be about 180° C. and the set time may be about 1 to about 2 minutes. Alternatively, when the wiping yarn 5 is heat-treated at about 160° C. for about 4 minutes, the wiping yarn 5 may be substantially perpendicularly secured, but the heat-treatment time may be unnecessarily long, which may decrease productivity. Further, when the wiping yarn 5 is heat-treated at about 180° C. for about 1 minute, the wiping yarn 5 may be substantially perpendicularly secured, but when about 3 minutes elapses, the core yarns 16 may melt again. Furthermore, when the wiping yarn 5 is heat-treated at about 200° C. for about 1 minute, the core yarns 16 may melt. As a result, the wiping yarn 5 may be heat-treated at a temperature of about 180° C. for approximately about 1 to about 2 minutes.

The heat-treatment process may cause the third core yarn 17 to melt and serve as an adhesive. Further, the fourth core yarn 19 and the sub-yarn 21 may be sturdily adhered to the first core 13 and the second core yarn 15 and the wiping yarn 5 may be substantially perpendicularly secured. The substantial perpendicular securing of the wiping yarn 5 may prevent the wiping yarns 5 from tangling with each other when the wiping device 1 is repeatedly operated and stopped.

Within the wiping yarn 5, when one end (e.g., a first end) is perpendicularly erected, an opposite end (e.g., a second end) may be slanted up to about 20°. The wiping yarn 5 may prevent scratching of the surface of the vehicle body 7 while the wiping yarn 5 is in contact with the vehicle body. Further the wiping yarn 5 may be mass-produced, which may decrease material costs and demand needs for the wiping yarn 5 may be met more easily.

Figure 3:
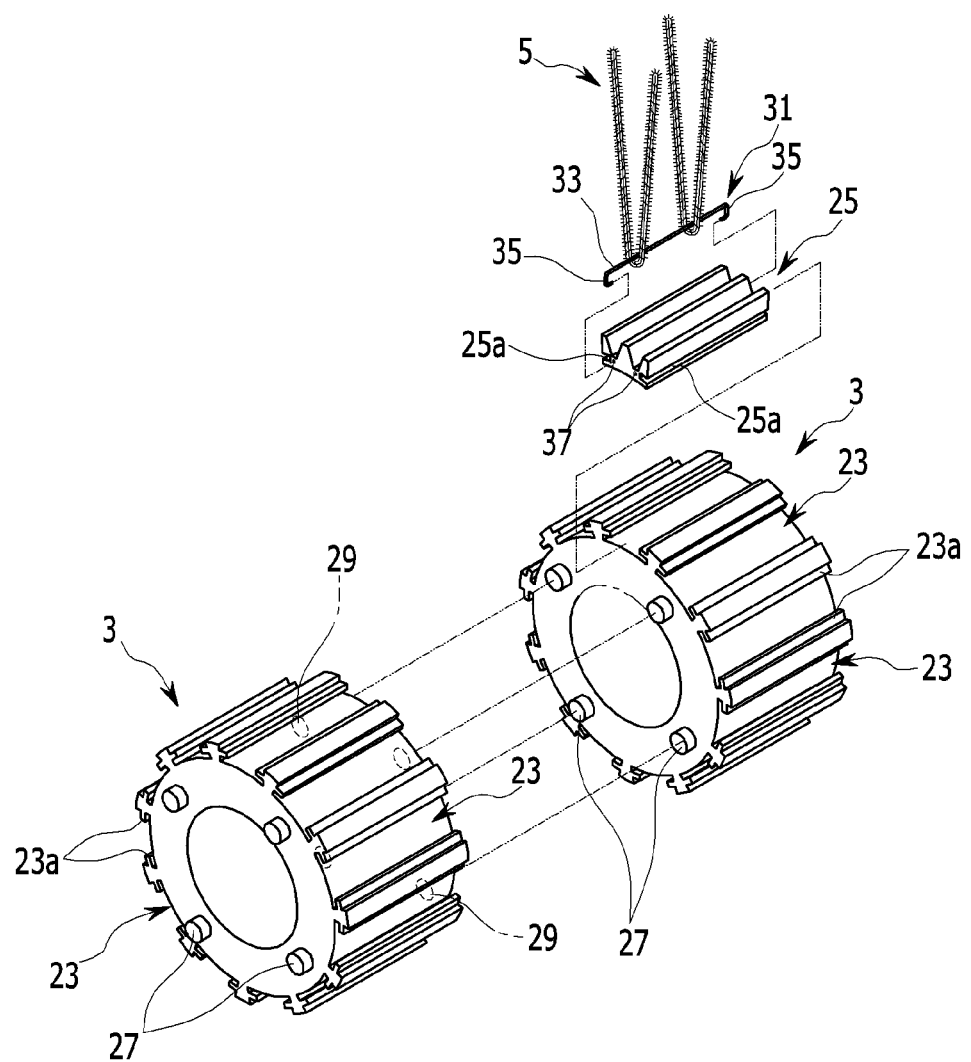
FIG. 3 is an exemplary detailed view of a cartridge and an insertion block of the wiping device according to the exemplary embodiment of the present invention.
Figure 4:
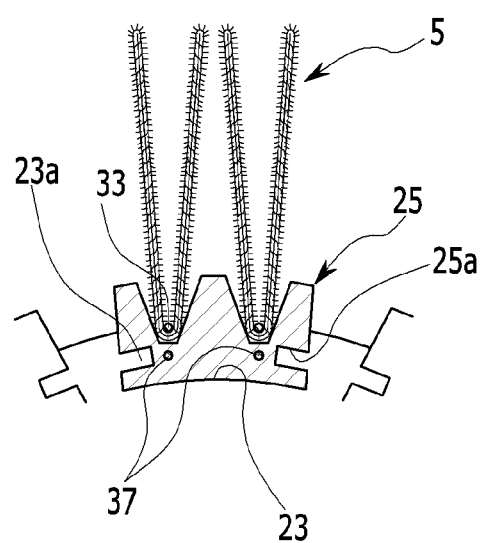
FIG. 4 is an exemplary partially enlarged side cross-sectional view of the cartridge and the insertion block of the wiping device according to the exemplary embodiment of the present invention.

FIG. 3 is an exemplary detailed view of a cartridge and an insertion block of the wiping device according to the exemplary embodiment of the present invention, and FIG. 4 is an exemplary partially enlarged side cross-sectional view of the cartridge and the insertion block of the wiping device according to the exemplary embodiment of the present invention.

Referring to FIGS. 3 and 4, the cartridge 3 with the wiping yarn 5 may include a plurality of cartridges, which may be coaxially repeated and joined to each other. One or more insertion grooves 23 may be formed on an outer circumference of the cartridge 3, and insertion blocks 25 with the wiping yarn 5 may be removably joined to the insertion grooves 23. Further, one or more joining protrusions 27 may protrude from one side of the cartridge 3 in a circumferential direction, and a joining groove 29, joined with the joining protrusion 27, may be formed on an opposite side that corresponds to the joining protrusions. As a result, the plurality of cartridges 3 may be repeatedly joined using the joining protrusions 27 and the joining grooves 29 and may prevent slipping when the cartridge 3 rotates.

Meanwhile, guide grooves 25a may be formed on both sides of the insertion block 25 and may join with the insertion grooves. Further, guide protrusions 23a that correspond to each guide groove 25a may be formed on the insertion groove 23, and the insertion block 25 may be removably joined to the insertion groove 23. Accordingly, when the wiping yarn 5 falls out of the insertion block 25 or becomes damaged, the insertion block 25 that corresponds to the damaged or missing yarn may be individually replaced. Herein, the guide groove 23a and the guide groove 25a may be formed contrary thereto. In other words, the guide groove 23a may be formed within the insertion block 25 and the guide groove 25a may be formed on the insertion groove 23.

Meanwhile, the wiping yarn 5 may be disposed on the insertion block 25 using one or more clips 31. The clip 31 may be made of a substantially elastic material, and may include fixation ends 33 configured to fix the wiping yarn 5 and insertion ends 35. The plurality of clips 31 may be joined to the insertion blocks 25 while the insertion ends 35 may be inserted into joining apertures 37. Accordingly, the fixation ends 33 may join the insertion block 25 to the insertion groove 23 and the plurality of wiping yarns 5 may be disposed between the fixation end 33 and the insertion block 25. Further, the clip 31 may sturdily fix the wiping yarn 5 to the insertion block 25. When the cartridge 3 and the insertion block 25 are used and the wiping yarn 5 falls out or is damaged, the wiping yarn 5 may more easily be replaced by replacing or removing the individual insertion block 25 of the damaged or missing part, which may reduce maintenance costs of the wiping device 1.

An exemplary embodiment of the present invention may prevent scratches to the surface of the vehicle body 7 while the wiping yarn 5 directly contact the surface of the vehicle body 7. Further, the wiping yarn 5 may be more sturdily attached to the insertion block 25 using the substantially elastic clip 31. Furthermore, the wiping yarn 5 may be more easily mass-produced than an ostrich feather used in the related art, which may decrease material costs and demand needs for the yarn may be met more easily.

While this invention has been described in connection with what is presently considered to be exemplary embodiments, it is to be understood that the invention is not limited to the exemplary embodiments, but, on the contrary, is intended to cover various modifications and equivalent arrangements included within the spirit and scope of the appended claims.

What is claimed is:

1. A wiping device, comprising:
   a cartridge; and
   a wiping yarn disposed on an outer circumference of the cartridge,
   wherein the wiping yarn includes:
      a core yarn substantially perpendicular to the cartridge; and
      a sub-yarn disposed extraneous to the core yarn and configured to gather contaminants from a vehicle body,
   wherein the core yarn includes:
      a first core yarn disposed at a substantial center of the wiping yarn;
      a second core yarn disposed extraneous to the first core yarn;
      a third core yarn disposed extraneous to the second core yarn; and
      a fourth core yarn wrapped around an exterior of the third core yarn.

2. The wiping device of claim 1, wherein the wiping device is heat-treated at a set temperature for a set time, and during the heat treatment, the sub-yarn adheres to the third core yarn when the third core yarn melts.

3. The wiping device of claim 1, wherein the first and fourth core yarns are made of a polypropylene resin.

4. The wiping device of claim 1, wherein the second core yarn is made of a polyester resin.

5. The wiping device of claim 1, wherein the third core yarn is made of a nylon resin.

6. The wiping device of claim 1, wherein the sub-yarn is includes a micro-fiber fixed by the fourth core yarn.

7. The wiping device of claim 1, wherein the sub-yarn is made of a polyester resin.

8. A wiping device, comprising:
   a cartridge; and
   a wiping yarn disposed on an outer circumference of the cartridge,
   wherein the wiping yarn includes:
      a core yarn substantially perpendicular to the cartridge; and a sub-yarn disposed extraneous to the core yarn and configured to gather contaminants from a vehicle body, wherein one or more insertion grooves are formed on the outer circumference of the cartridge, and an insertion block with the wiping yarn attached to the insertion block is removably joined to the insertion groove, and wherein, the cartridge further includes:
one or more joining protrusions formed on one side in the circumferential direction within the cartridge; and
joining grooves, configured to join with the joining protrusions, are formed at an opposite side within the cartridge.

9. The wiping device of claim 8, wherein the insertion block further includes:
guide grooves are formed on both sides of the insertion block in the direction of the respective the insertion grooves to be joined to the guide grooves;
guide protrusions that correspond to the guide grooves are formed on the insertion grooves, respectively; and
the insertion block is removably joined to the insertion groove.

10. The wiping device of claim 8, wherein the wiping yarn is disposed on the insertion block by one or more clips.

11. The wiping device of claim 10, wherein the clips include:
fixation ends disposed on the insertion block to fix the insertion block to the insertion groove and fix the wiping yarn to the insertion block; and
insertion ends formed by bending both ends of the fixation end downwards and inserting the insertion ends into joining apertures formed on the side of the insertion block.

12. A wiping device, comprising:
a cartridge with one or more insertion grooves formed on an outer circumference of the cartridge;
an insertion block removably joined to the insertion groove; and
a wiping yarn disposed on the cartridge through the insertion block,
wherein the wiping yarn includes:
a first core yarn disposed at a substantial center of the wiping yarn;
a second core yarn disposed extraneous to the first yarn;
a third core yarn disposed extraneous to the second yarn;
a fourth yarn wrapped around an exterior of the third yarn; and
sub-yarns disposed extraneous to the third yarn and configured to gather contaminants of a vehicle body.

13. The wiping device of claim 12, wherein the first and fourth core yarns are made of a polypropylene resin, the second core yarn and the sub-yarn are made of a polyester resin, and the third core yarn is made of a nylon resin.

14. The wiping device of claim 13, wherein the wiping yarn is heat-treated at a set temperature for a set time, and during the heat treatment, the sub-yarn adheres to the third yarn when the third core yarn melts, and the sub-yarn is includes a micro-fiber fixed by the fourth core yarn.

15. The wiping device of claim 12, wherein one or more joining protrusions are formed on one side in the circumferential direction within the cartridge, and joining grooves, configured to join with the joining protrusions, are formed on an opposite side.

16. The wiping device of claim 12, further comprising:
guide grooves are formed on both sides of the insertion block in the direction of the respective the insertion grooves to be joined to the guide grooves; and
guide protrusions that correspond to the guide grooves are formed on respective insertion grooves; wherein
the insertion block is removably joined to the insertion groove.

17. The wiping device of claim 16, wherein the wiping yarn is disposed on the insertion block using one or more clips.

18. The wiping device of claim 17, wherein the clips include:
fixation ends disposed on the insertion block such that the insertion block is joined to the insertion groove and fixes the wiping yarn; and
insertion ends formed by bending both ends of the fixation end downwards and inserting the insertion ends into joining apertures formed on the side of the insertion block.

* * * * *